US011833624B2

(12) United States Patent
Hutchison

(10) Patent No.: US 11,833,624 B2
(45) Date of Patent: Dec. 5, 2023

(54) METHOD FOR DETERMINING ARC CONSISTENCY IN PULSED GAS METAL ARC WELDING SYSTEMS

(71) Applicant: Illinois Tool Works Inc., Glenview, IL (US)

(72) Inventor: Richard Martin Hutchison, Iola, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1233 days.

(21) Appl. No.: 16/418,452

(22) Filed: May 21, 2019

(65) Prior Publication Data

US 2020/0139470 A1  May 7, 2020

Related U.S. Application Data

(63) Continuation of application No. 13/427,507, filed on Mar. 22, 2012, now Pat. No. 10,293,425.

(60) Provisional application No. 61/468,860, filed on Mar. 29, 2011.

(51) Int. Cl.
*G06F 3/048* (2013.01)
*B23K 9/09* (2006.01)
*B23K 9/095* (2006.01)

(52) U.S. Cl.
CPC ............ *B23K 9/091* (2013.01); *B23K 9/0953* (2013.01)

(58) Field of Classification Search
CPC ............................. B23K 9/091; B23K 9/0953
See application file for complete search history.

(56) References Cited

U.S. PATENT DOCUMENTS

| 5,416,299 | A | 5/1995 | Tabata | |
|---|---|---|---|---|
| 6,002,104 | A | 12/1999 | Hsu | |
| 8,688,815 | B2 * | 4/2014 | Chantry | G06Q 10/103 |
| | | | | 219/136 |
| 8,809,737 | B2 * | 8/2014 | Ang.berg | B23K 9/093 |
| | | | | 219/130.51 |
| 2003/0071024 | A1 | 4/2003 | Hsu | |
| 2004/0232128 | A1 * | 11/2004 | Niedereder | B23K 9/1056 |
| | | | | 219/130.5 |
| 2005/0133488 | A1 * | 6/2005 | Blankenship | B23K 9/1068 |
| | | | | 219/130.01 |

(Continued)

FOREIGN PATENT DOCUMENTS

WO       2008036433 A2      3/2008

OTHER PUBLICATIONS

International Search Report & Written Opinion of PCT/US2012/030831 dated Jul. 23, 2012.

*Primary Examiner* — David Phantana-angkool
(74) *Attorney, Agent, or Firm* — McAndrews, Held & Malloy, Ltd.

(57) ABSTRACT

A welding system or an enterprise using welding systems can communicate with cloud-based resources for the provision of services and products to facilitate the welding operations. The communications may be via wired or wireless media, and may be direct, or through other components, such as enterprise networks, peripheral devices, and so forth. The cloud-based resources may provide for storage of data, particularly welding data, processing of data, welding protocols, specifications and processes, financial transactions for the purchase, licensing or use of welding-related products and services, welding training, and so forth.

20 Claims, 4 Drawing Sheets

(56) References Cited

U.S. PATENT DOCUMENTS

| | | | |
|---|---|---|---|
| 2008/0083705 A1* | 4/2008 | Peters | B23K 9/091 219/61 |
| 2010/0096373 A1* | 4/2010 | Hillen | B23K 9/0953 219/130.01 |
| 2012/0248081 A1* | 10/2012 | Hutchison | B23K 9/0953 219/130.51 |
| 2012/0255938 A1* | 10/2012 | Oe | B23K 26/0884 901/41 |
| 2015/0273612 A1* | 10/2015 | Peters | B23K 26/32 219/130.21 |
| 2020/0139470 A1* | 5/2020 | Hutchison | B23K 9/0953 |
| 2021/0237186 A1* | 8/2021 | Liu | B23K 9/16 |

* cited by examiner

METHOD FOR DETERMINING ARC CONSISTENCY IN PULSED GAS METAL ARC WELDING SYSTEMS

CROSS REFERENCE TO RELATED APPLICATIONS

This application is a Non-Provisional of U.S. Provisional Patent Application No. 61/468,860, entitled "Method for Determining Arc Consistency and Electrode Extension During GMAW-P", filed Mar. 29, 2011, which is herein incorporated by reference in its entirety.

BACKGROUND

The present invention relates generally to the field of welding systems, and particularly to pulsed gas metal arc welding systems (GMAW-P), also known as pulsed metal inert gas (pulsed MIG) welding systems.

Arc welding systems generally comprise a power supply that applies electrical current to an electrode so as to pass an arc between the electrode and a work piece, thereby heating the electrode and work piece to create a weld. In many systems, such as gas metal arc welding systems (GMAW), the electrode consists of a wire which is advanced through a welding torch. As the electrode is heated by the arc, the electrode melts and is joined to molten metal of the work piece to form the weld. By controlling the supply of voltage and current to the electrode, a GMAW system may control the manner in which the electrode is melted and deposited by the arc. For example, the voltage supply to the electrode may be held constant, while the current supply is varied so as to maintain a constant arc length independent of the distance between the contact tip and the work piece. A GMAW system may also supply voltage and current to an electrode in a periodic or pulsed manner, known as pulsed gas metal arc welding (GMAW-P) or pulsed metal inert gas (pulsed MIG) welding.

In a GMAW system, the arc melts the end of the electrode into a molten ball and transfers the molten ball onto the work piece. Rather than provide a single constant voltage-controlled or constant current-controlled arc, GMAW-P welding systems supply voltage and current to the electrode according to a periodic pattern as a power pulse. For example, a GMAW-P welding system may supply a constant low voltage in a first phase (the background phase), and then supply a constant high voltage in a second phase (the peak phase). In such a way, an arc may provide only enough power to melt the electrode in the background phase, while providing sufficient power to transfer the molten electrode material to the work piece in the peak phase. A GMAW-P system may allow a variety of parameters to be programmed to affect the power applied to form the weld, such as constant voltage levels, fixed current beginning points, constant current ramp rates, minimum and maximum current limits, time allowed for each phase, and so forth. Thus, pulses and the applied power may not be identical, varying the consistency of the GMAW-P welding arc and weld quality. The GMAW-P welding arc may be affected by the components of the GMAW-P system, the power source, environmental conditions at the work piece or welding torch, and operator skill. These factors, among others, may affect the quality of a weld.

BRIEF DESCRIPTION

In one embodiment, a welding system includes a welding torch, a base unit, and control circuitry. The base unit is configured to supply the welding torch with a pulsed electrical current for producing a welding arc in the welding torch. The control circuitry is configured to detect signals relating to the pulsed electrical current and to store in memory a pulsed waveform based on the signals as an idealized pulsed waveform.

In another embodiment, a method includes detecting signals and storing in memory a pulsed waveform based on the signals. The signals relate to a pulsed electrical current supplied to a welding torch for producing a welding arc in the welding torch. The pulsed waveform is stored in memory as an idealized pulsed waveform based on the signals.

In another embodiment, a welding system includes a welding torch, a base unit, and control circuitry. The base unit is configured to supply the welding torch with pulsed electrical signals for producing welding arcs in the welding torch. The control circuitry is configured to detect a first set of signals, store in memory a first pulsed power waveform, detect a second set of signals, compare a second pulsed power waveform with the first pulsed power waveform, and quantify a difference between the first pulsed power waveform and the second pulsed power waveform. The first set of signals relate to a first pulsed electrical current supplied to the welding torch by the base unit and the second set of signals relate to a second pulsed electrical current supplied to the welding torch by the base unit. The first pulsed power waveform is based on the first set of signals and the second pulsed power waveform is based on the second set of signals.

DRAWINGS

These and other features, aspects, and advantages of the present invention will become better understood when the following detailed description is read with reference to the accompanying drawings in which like characters represent like parts throughout the drawings, wherein.

Figure 3:
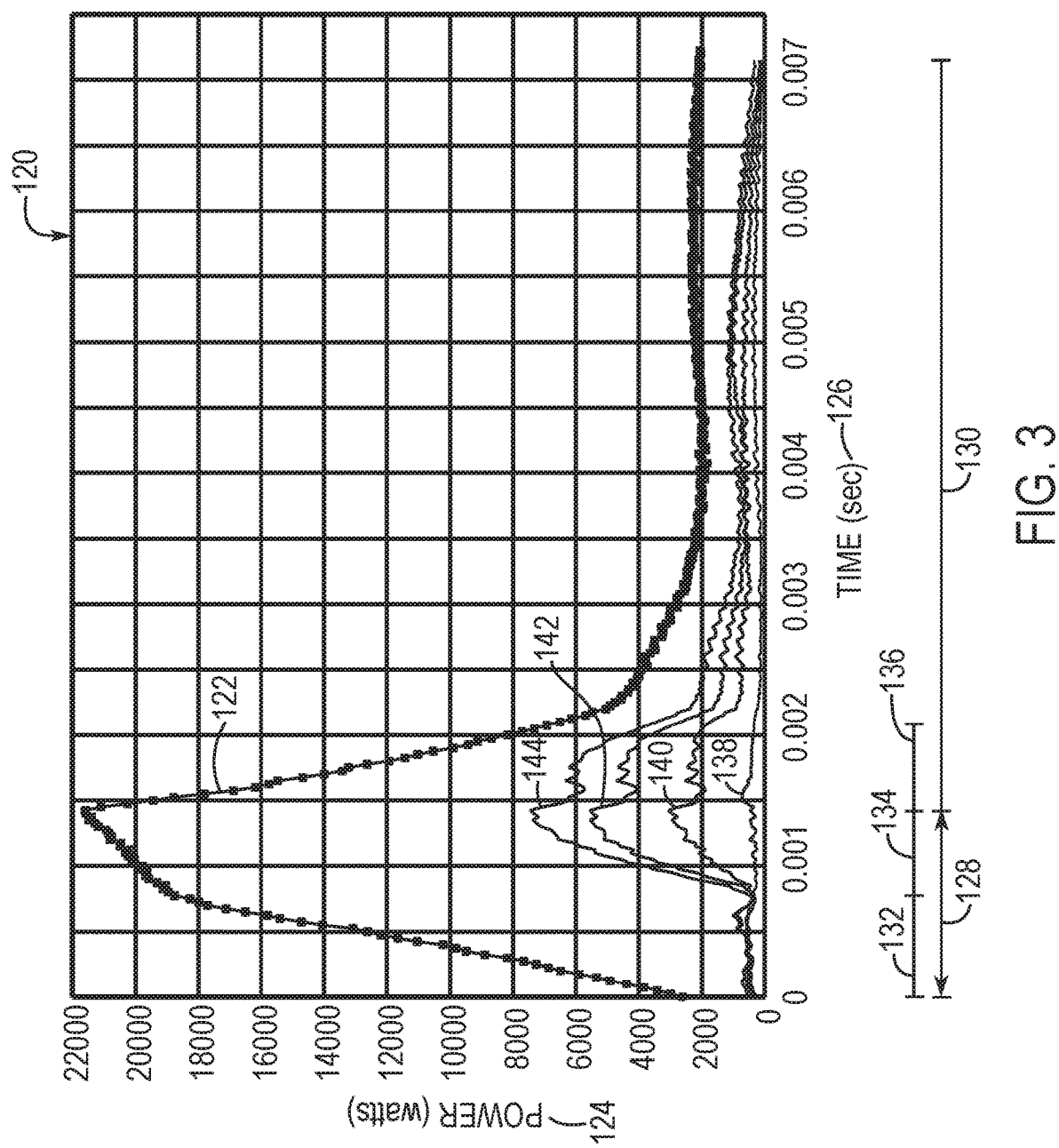
Figure 4:
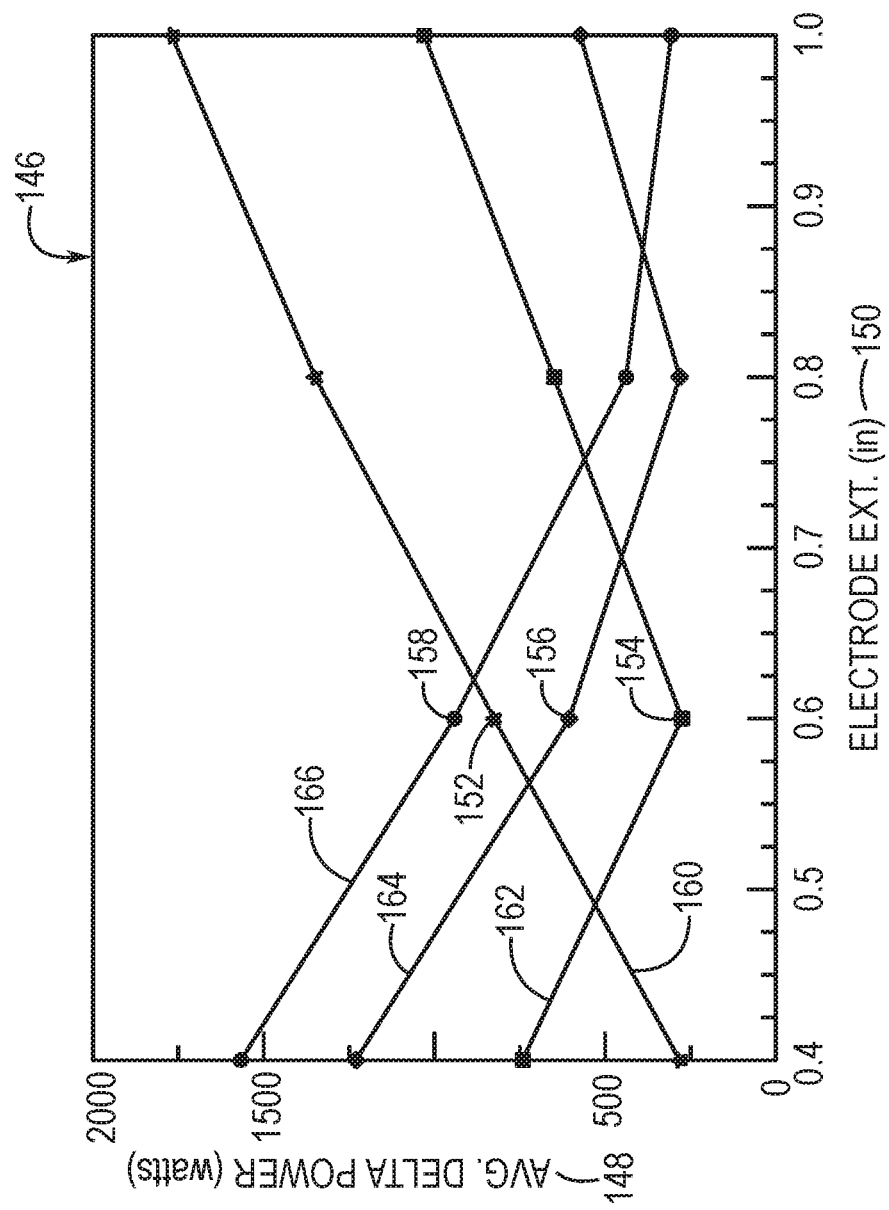

FIG. 3 is a chart of an ideal power pulse and the relative absolute value difference in power between sampled pulses and the ideal power pulse, in accordance with aspects of the present disclosure; and FIG. 4 is a chart of the average absolute valve power difference between sampled pulses and ideal power pulses with different electrode extensions, in accordance with aspects of the present disclosure.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The welding system and methods of the present invention may determine the consistency of a pulsed gas metal arc welding (GMAW-P) welding arc and weld parameters. The weld parameters may include, but are not limited to, electrode extension, shielding gas fluctuations, environmental conditions on a work piece, and melt-freeze of the electrode and work piece. A base unit of the welding system may be configured to supply a pulsed electrical current to a welding torch. The pulsed electrical current may relate to one or more pulsed waveforms, such as a voltage waveform, a current waveform, or a power waveform. Some pulsed waveforms (e.g., sampled pulsed waveforms) may be based at least in part on detected signals relating to the pulsed electrical current supplied to the welding torch. For example, a pulsed power waveform may represent a measured amplitude of the pulsed power waveform at discrete times during a pulse period. A memory of the welding system may store a plurality of pulsed waveforms for reference, comparison, and analysis. Some stored pulsed waveforms may be preset in memory, correspond to a simulated pulsed electrical current, and/or be loaded from a peripheral device (e.g., another welding system) or a connected network.

Some pulsed waveforms may be stored as reference (e.g., ideal) pulsed waveforms. Ideal pulsed waveforms may be used for comparison with sampled pulsed waveforms. An operator may select (via an operator interface) the sampled pulsed waveform to be stored as an ideal pulsed waveform. For example, after performing a series of welds, the operator may select the sampled pulsed waveform corresponding to a desired quality weld to be the ideal pulsed waveform to be used for comparison to subsequent performed welds. After obtaining the ideal pulsed waveform, the welding system may compare sampled pulsed waveforms corresponding to subsequent welds to the ideal pulsed waveform. Comparison may yield differences between the ideal pulsed waveform and the sampled pulsed waveform. These differences may indicate inconsistencies in the GMAW-P welding arc relating to the sampled pulsed waveforms and the relative quality of the weld produced by the sampled pulsed waveform. For example, the sampled pulsed waveform from a relatively poor quality weld may yield differences when compared to the idealized pulsed waveform of a good quality weld. Small differences may indicate a relatively consistent arc. Comparison may also readily indicate other parameters, such as electrode extension, that may otherwise be difficult to determine, particularly in real-time. These differences and parameters may be processed and/or displayed on an operator interface of the welding system. For example, the operator interface may present an alert to the operator if the difference exceeds a pulsed waveform difference threshold. The operator may adjust this pulsed waveform difference threshold.

Figure 1:
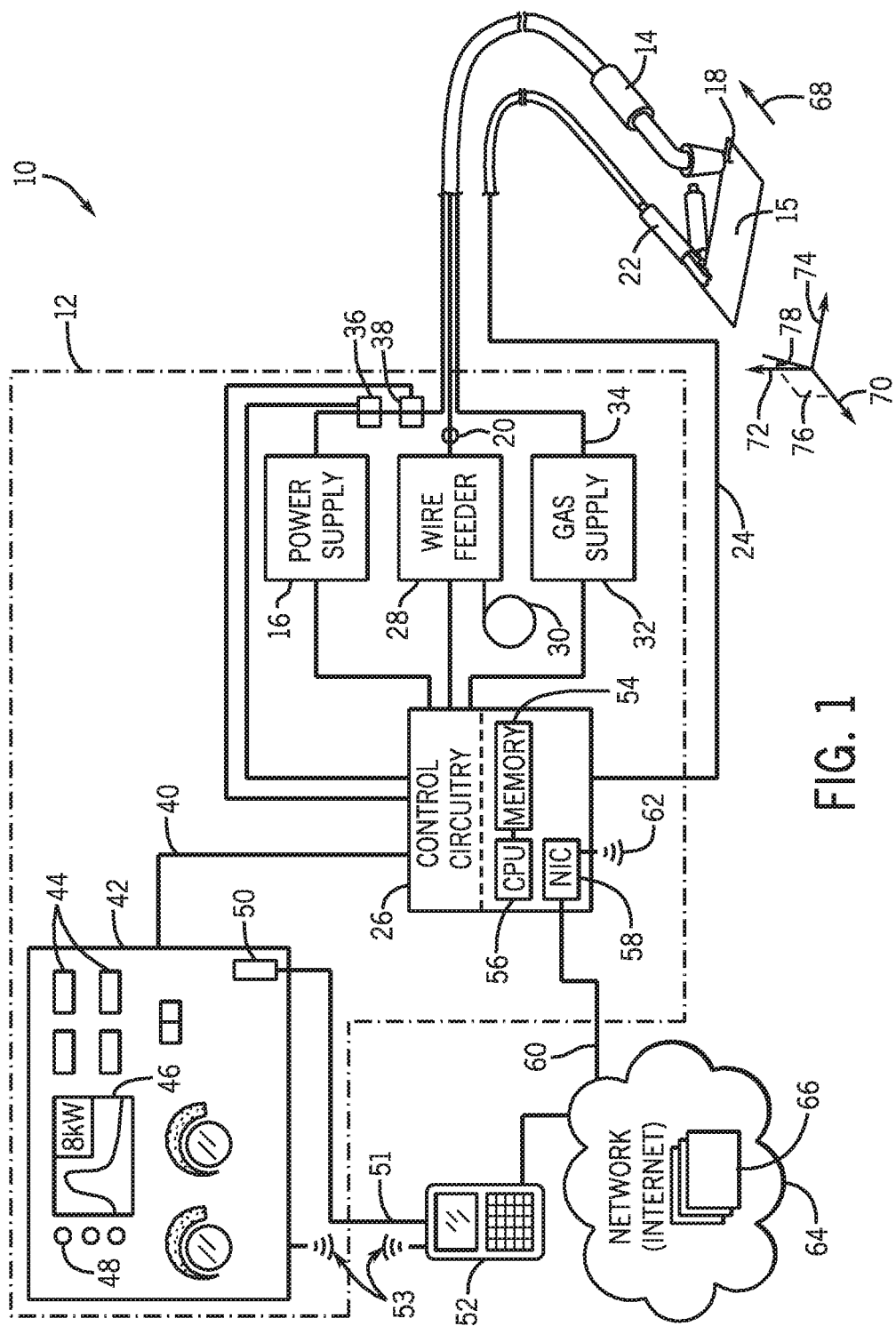
FIG. 1 is a block diagram of a welding system having control circuitry to analyze pulsed waveforms, in accordance with aspects of the present disclosure.

Turning now to the drawings, FIG. 1 is a block diagram of a welding system 10 for determining consistency of a GMAW-P welding arc and weld parameters. In the illustrated embodiment, the welding system 10 is a GMAW-P welding system, although the present techniques may be used on other welding systems, such as other metal inert gas (MIG) welding systems, and so forth. The welding system 10 includes a base unit 12 operably coupled with a welding torch 14. Placement of the welding torch 14 proximate to a work piece 15 allows an electrical current, supplied by a power supply 16, to form an arc 18 from an electrode 20 (e.g., welding wire) to the work piece 15. The arc 18 completes an electrical circuit from the power supply 16 to the electrode 20, to the work piece 15, then back to ground via a ground clamp 22 and a ground cable 24. The ground cable 24 is operably coupled to the power supply 16 through control circuitry 26. The heat produced by the arc 18 causes the electrode 20 and/or work piece 15 to transition to a molten state, facilitating the weld.

The base unit 12 powers, controls, and supplies consumables to the welding torch 14 for a welding application. For example, the power supply 16 supplies the welding torch 14 with power (e.g., pulsed power waveforms), the wire feeder 28 supplies the electrode 20 from an electrode supply 30 (e.g., spool), and the gas supply 32 supplies shielding gas through a conduit 34. The electrode 20 may be of various types, including traditional wire electrode or gasless wire electrode. Shielding gas from the gas supply 32 shields the weld area of the electrode 20 and work piece 15 from contaminants during welding, to enhance arc performance, and to improve the resulting weld.

To precisely control the deposition of molten material from the electrode 20 onto the work piece 15, the control circuitry 26 may control the power supply 16, the wire feeder 28, and the gas supply 32. The control circuitry 26 may control the power supplied to the welding torch 14 by adjusting the voltage and current waveforms supplied to the welding torch 14. In an embodiment, the control circuitry 26 may control the power supply 16 to supply power to the welding torch 14 at a desired power level through a series of power pulses. The power supply 16 may provide the desired power level to the welding torch 14 by varying the current and voltage supplied to the torch 14. The control circuitry 26 monitors the supply voltage and current with a voltage sensor 36 and a current sensor 38. By varying the voltage and current supplied to the welding torch 14, the control circuitry 26 controls the intensity of the arc 18 and, accordingly, the manner in which the molten material from the electrode 20 is deposited onto the work piece 15. In an embodiment, the control circuitry 26 may vary the power supplied to the welding torch 14 by voltage and current supplied by the power supply 16 to the welding torch 14 according to a predetermined algorithm. For example, in an embodiment operating at 220 Hz with a background voltage level at 17 V, the power supply 16 may vary the voltage level to a peak voltage level of 35 V for the peak phase of about 1.0 ms. For the same embodiment, the peak current ramp rate may be 1000 A/ms and the initial peak current may be 550 A. The power (i.e., the product of current and voltage) supplied to the welding torch 14 may remain substantially constant while the current and voltage provided by the power supply 16 may vary from the current and voltage at the arc 18 due to induction. In other words, the power supply 16 may supply the same power to the welding torch 14 through each power pulse, however the actual current and voltage levels supplied in each pulse may vary.

The control circuitry 26 may be coupled by a control line 40 to an operator interface 42. The operator interface 42 may include input devices 44 (e.g., dials, buttons, switches, and so forth) configured to provide for operator adjustment of the base unit operation. For example, input devices 44 such as dials may enable operator adjustment based on properties (e.g., size, material, and so forth) of the electrode 20 and the work piece 15. The input devices 44 may also enable adjustment of the wire feeder 28 and the gas supply 32 through the control circuitry 26. A display 46 may display information pertaining to the operational status of the welding system 10, arc consistency, weld quality, and/or weld parameters. The display 46 and input devices 44 may be used together to navigate menus, adjust operational settings of the base unit 12 (e.g., input voltage, output power, pulse period, electrode feed rate, and so forth), and display pulsed waveforms. As discussed in detail below, pulsed waveforms may be stored in memory 54 of the control circuitry 26. The input devices 44 and display 46 may be configured to provide for selection, storage, and analysis of pulsed waveforms stored in memory 54. Indicators 48 may be used to alert the operator to conditions and the status of the welding system 10. For example, the indicators 48 may be used to alert the operator of low electrode supply 30 or of a relatively poor weld quality.

The operator interface 42 may include an accessory input 50 configured to couple a remote device 52 (e.g., a cell phone, laptop computer, welding helmet, PDA, and so forth) to the control circuitry 26. In an embodiment, the remote device 52 may be the operator interface 42 used to monitor or control at least part of the welding system 10. In some embodiments, the remote device 52 may be a secondary or additional operator interface 42. The remote device 52 may be connected to the operator interface 42 and/or the control circuitry via a wired connection 51 or a wireless connection 53.

The control circuitry 26 includes the memory 54 and a processor 56. The processor 56 may be configured to process signals and produce a pulsed waveform based on the processed signals. In some embodiments, the memory 54 may be ROM (e.g., non-volatile), RAM (e.g., volatile), magnetic storage memory, optical storage memory, or a combination thereof. The memory 54 may be configured to store one or more pulsed waveforms. Stored pulsed waveforms may be used for reference, analysis, or comparison to evaluate arc consistency and weld parameters. In addition, a variety of control regimes for various welding processes, along with associated settings and parameters may be stored in the memory 54. The memory 54 may also store codes configured to provide a specific output (e.g., initiate wire feed, enable gas flow, etc.) during operation.

In some embodiments, the control circuitry 26 may also include a network interface card (NIC) 58. The NIC 58 may be configured for wired communications 60 or wireless communications 62 with other devices or networks 64 (e.g., the Internet). Stored pulsed waveforms may be uploaded to web pages 66 across the network 64 for remote access to other welding systems 10. In some embodiments, certain web pages 66 may be used to access stored pulsed waveforms. Further, in some embodiments, devices (e.g., the remote devices 52) may access the control circuitry 26 via the network 64 to monitor and/or control operation of the base unit 12.

In an embodiment, the voltage and current sensors 36, 38 may transmit signals with the control circuitry 26 related to the pulsed electrical signal generating the arc 18. The processor 56 may produce a pulsed waveform (e.g., pulsed power waveform) based on the sensed signals. In some embodiments, the pulsed waveform may be a pulsed voltage waveform or a pulsed current waveform. Voltage waveforms and current waveforms may be readily produced from the voltage and current sensors 36, 38. However, other pulsed waveforms may also be produced. For example, other pulsed waveforms may be produced from a mathematical combination of the pulsed voltage waveform and the pulsed current waveform, such as pulsed power (voltage*current) or pulsed impedance (voltage/current). Pulsed power and impedance waveforms account for voltage and current simultaneously in a single waveform, and thus the processor 56 may process pulsed power or impedance waveforms more quickly than both pulsed voltage and current waveforms. The produced pulse waveforms may be stored in the memory 54 for reference, analysis, or comparison with other pulse waveforms.

As illustrated, the welding torch 14 may be used to weld a work piece 15 in a weld direction 68. As indicated by the legend, arrow 70 indicates a horizontal X-axis along the work piece 15, arrow 72 indicates a vertical Y-axis relative to the work piece 15, and arrow 74 indicates a horizontal Z-axis along the work piece 15. During a weld, the welding torch 14 may be moved in the weld direction 68 and maintained at a desired relative position to the work piece 15 throughout the weld. For example, an ideal weld may be performed by maintaining the welding torch 14 in the XY plane 76 at a small angle 78 with respect to the Y-axis 72 as the welding torch 14 moves along the X-axis 70 in the weld direction 68 with no relative rotation of the welding torch 14 with respect to the X-axis 70 or Z-axis 74. During the ideal weld, the electrode 20 may extend a certain distance from the welding torch 14, known as electrode extension. The control circuitry 26 detects the pulsed electrical signals that produce the arc 18 for the ideal weld, and the control circuitry 26 produces one or more sample pulsed waveforms corresponding to the ideal weld. In some embodiments, the ideal pulsed waveform may be a power waveform, a current waveform, a voltage waveform, or combinations thereof, as discussed above. A pulsed waveform based at least in part on the one or more sample pulsed waveforms may be stored in the memory 54 as an ideal pulsed waveform. Multiple ideal pulsed waveforms may be stored in the memory 54. For example, multiple ideal pulsed waveforms may correspond to various work piece, electrode, and shielding gas combinations, different operators, and different torches, and different types of welds, among others.

From the one or more sample pulsed waveforms, the ideal pulsed waveform may be selected as the median pulsed waveform, the mean pulsed waveform, the most recent sampled pulsed waveform, a random sample pulsed waveform, or any pulsed waveform selected by the operator. For example, the operator may perform a six-inch weld of which the last three inches are an ideal weld. The six-inch weld may correspond to hundreds of sampled pulsed waveforms. The operator may use the operator interface to select the ideal pulsed waveform from the sampled pulsed waveforms corresponding to the last three inches by activating an input device (e.g., button). In some embodiments, the control circuitry 26 may select a typical (e.g., average, median) pulsed waveform as the ideal pulsed waveform by an algorithm. The algorithm may be stored in memory 54 and run by the processor 56. The algorithm may determine the typical pulsed waveform to be stored as the ideal pulsed waveform from a set of sampled pulsed waveforms corresponding to the ideal weld. In an embodiment, the display 46 may display the sampled pulsed waveforms, and the input devices 44 may be used to select the ideal pulsed waveform to be stored in the memory 54. In another embodiment, the remote device 52 may be used to select the ideal pulsed waveform from the sampled pulsed waveforms. The sampled pulsed waveforms may be stored in the memory 54 for later reference to determine the pulsed waveforms corresponding to the ideal weld. For example, the performed weld may be analyzed (e.g., subjected to X-rays, tested) to determine the quality of the performed weld. Based on the analysis, the ideal pulsed waveform may be determined as corresponding to the portion of the performed weld with a desired quality.

The ideal pulsed waveform may also be stored in the memory 54 from different sources. In some embodiments, one or more ideal pulsed waveforms may be predefined in the memory 54, corresponding to various weld parameters. In an embodiment, one or more ideal pulsed waveforms may be loaded into the memory 54 from a remote device 52 (e.g., PDA, flash drive) or the network 64 (e.g., the Internet). These ideal pulsed waveforms loaded into the memory 54 may be simulated waveforms or ideal pulsed waveforms from another welding system 10. Ideal pulsed waveforms loaded in the memory 54 may be used for comparison to determine the quality and/or weld parameters of subsequently performed welds.

A variety of conditions may affect the shape, amplitude, and duration of the pulsed waveforms. Weld parameters that affect the weld quality may also affect the pulsed waveform. The weld parameters may include, but are not limited to, positioning of the welding torch 14 relative to the work piece 15, weld direction 68, electrode extension, electrode properties (e.g., feed rate, composition, electrode type, and so forth), shielding gas properties (e.g., flow rate, composition, and so forth), environmental conditions (e.g., oil, moisture, or oxidation on the work piece 15), and condition of the base unit 12. Welds performed with a common set of weld parameters may have similar pulsed waveforms. For example, a first weld performed under a first set of weld parameters may be represented by a first ideal pulsed waveform. A second weld performed under a second set of weld parameters may be represented by a series of sampled pulsed waveforms. A comparison of the first ideal pulsed waveform with the series of sampled pulsed waveforms may yield differences indicative of the differences between the first set of weld parameters and the second set of weld parameters. These differences may be used for diagnostic purposes and to measure weld quality of the second weld relative to the first weld. In some embodiments, the control circuitry 26 may determine the consistency of the welding arc 18 of the second weld relative to the welding arc 18 of the first weld by comparing the sampled pulsed parameters to the first ideal pulsed waveform. In an embodiment, electrode extension may be determined based on a comparison of one or more ideal pulsed waveforms corresponding to common weld parameters and known electrode extensions with a sampled pulsed waveform corresponding to the common weld parameters and an unknown electrode extension.

Figure 2:
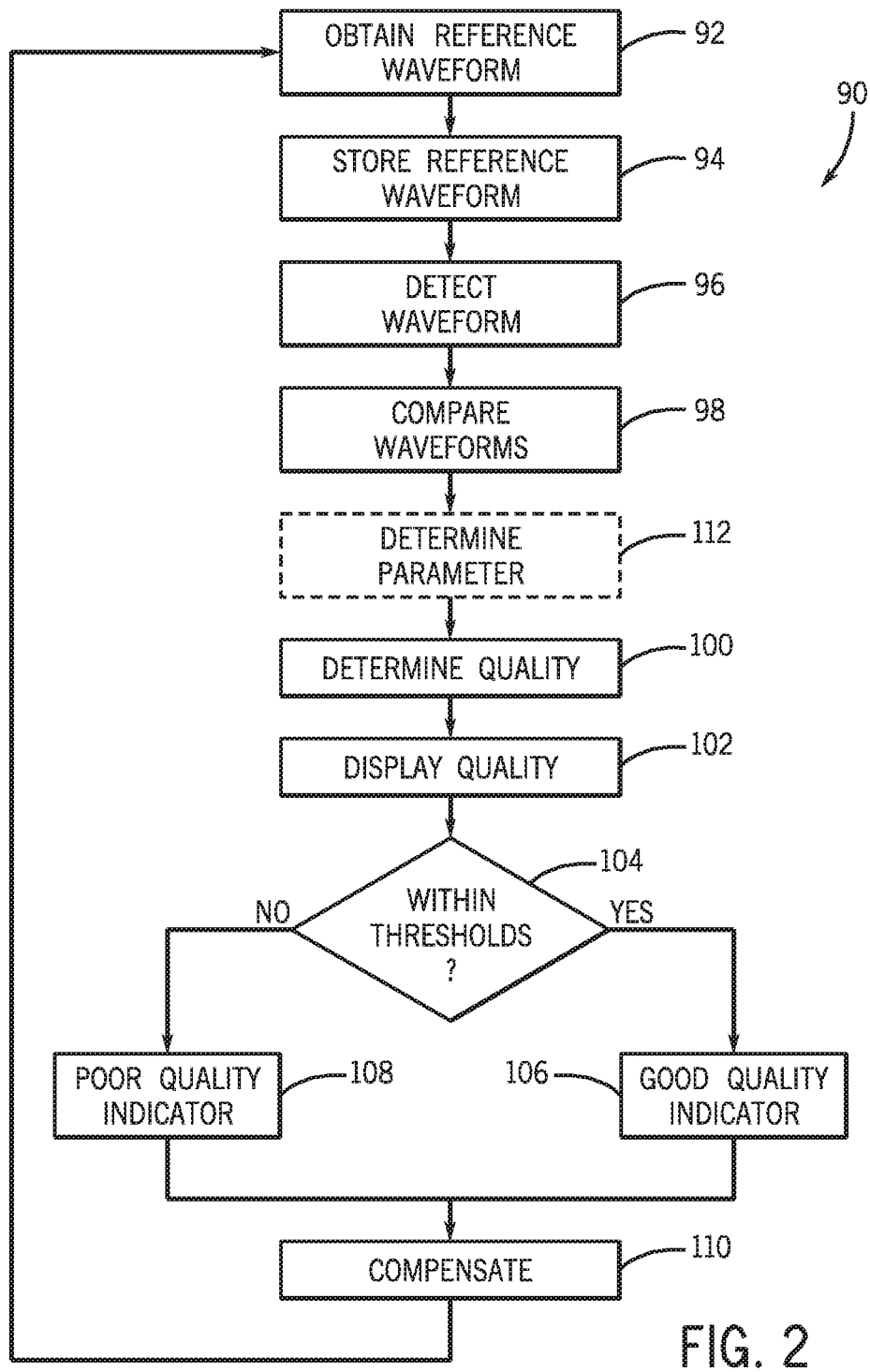
FIG. 2 is a flow chart of a method for comparing a stored reference pulsed waveform to a sampled pulsed waveform, in accordance with aspects of the present disclosure.

FIG. 2 illustrates a block diagram of a method 90 for determining consistency of the welding arc 18 among welds. The first step is to obtain a reference pulsed waveform (e.g., step 92). In an embodiment, the reference pulsed waveform may be an ideal pulsed waveform obtained from an ideal weld performed by the welding system 10 (e.g., based on detected electrical signals from sensors, such as the voltage and current sensors 36, 38), and selected through the operator interface 42. For example, the reference pulsed waveform may be obtained by receiving a command to store the idealized pulsed waveform via the operator interface. Alternatively, the idealized pulsed waveform may be obtained by an algorithm applied to the pulsed waveforms from an ideal weld. In some embodiments, the reference pulsed waveform may be a pulsed waveform obtained from a remote device 52, a network 64 (e.g., Internet) coupled to the base unit 12, or another welding system 10. The reference pulsed waveform may be obtained from a simulation or from a reference performed weld.

Once obtained, the reference pulsed waveform may be stored (e.g., step 94). In some embodiments, the reference pulsed waveform is stored in the memory 54 of the control circuitry 26. In other embodiments, the reference pulsed waveform may be stored on a remote device 52 or over the network 64. Then, the control circuitry 26 may detect a pulsed waveform (e.g., step 96). The pulsed waveform may be detected by detecting electrical signals relating to electrical pulses supplied to the welding torch 14. As discussed above, in some embodiments, the control circuitry 26 may produce pulsed waveforms based on the detected electrical signals from sensors (e.g., the voltage and current sensors 36, 38). In some embodiments, the control circuitry 26 may produce a sampled pulsed waveform corresponding to each electrical pulse of a performed weld. In other embodiments, the control circuitry 26 may produce a sampled pulsed waveform based at least in part on a plurality of electrical pulses of a performed weld. For example, a sampled pulsed waveform may be produced based on the median electrical pulse of the performed weld, the mean electrical pulse of the performed weld, the most recent detected electrical pulse of the performed weld, a random electrical pulse of the performed weld, or a combinations thereof.

Each pulsed waveform (e.g., ideal pulsed waveform, sampled pulsed waveform, and so forth) may be an array that includes a series of pulse amplitudes corresponding to a particular time of the pulse and/or weld. In an embodiment, the pulse period of each pulsed waveform supplied to the welding torch 14 may be between approximately 0.001 second to approximately 0.015 second, approximately 0.004 second to approximately 0.01 second, or approximately 0.005 second to approximately 0.008 second. The amplitude of each pulse may be sampled at a rate in a range of approximately 5 kHz to approximately 150 kHz, approximately 20 kHz to approximately 100 kHz, or approximately 30 kHz to approximately 50 kHz. For example, a 0.007 second electrical pulse may be sampled at a sample rate of approximately 40 kHz, resulting in approximately 280 samples per pulse. The sampled pulsed waveform may also be stored in the memory 54.

The sampled pulsed waveform may then be compared with the reference pulsed waveform (e.g., step 98). In some embodiments, the reference and sampled pulsed waveforms may be compared point-to-point. For example, for pulsed waveforms of substantially the same pulse period, the control circuitry 26 may quantify the difference (e.g., absolute value) between corresponding points of the reference and sampled pulsed waveforms. As discussed below with respect to FIG. 3, the reference pulsed waveform and the sampled pulsed waveform may have the same pulse period and general shape for the certain phases of the pulsed waveforms, yet the amplitudes may differ during other phases. In some embodiments, other properties of the pulsed waveforms, including the peak amplitude, average amplitude, pulse duration, and combinations thereof, may be compared.

The next step is to determine the quality of the sampled pulsed waveform relative to the reference pulsed waveform (e.g., step 100). The quality may be a measure of the consistency between the sampled and reference pulsed waveforms. The reference pulsed waveform may be a pulsed waveform that corresponds to an ideal (e.g., good quality, efficient) weld. During GMAW-P welding, the electrical pulse supplied to the welding torch 14 may sufficiently melt the electrode 20 in a background phase so that it may be transferred to the work piece 15 in the transfer phase. Particular properties of the reference pulsed waveform may be indicative of weld quality. The pulsed waveform of an ideal weld may have particular amplitudes at certain times during these phases that contribute to the ideal weld. For example, the ideal pulsed power waveform of the ideal weld may supply power at certain levels to melt the electrode 20 at an ideal rate for the set of weld parameters. The ideal pulsed power waveform may ideally transfer the electrode 20, whereas different sampled pulsed power waveforms may produce spatter and/or cause stick-slip between the electrode 20 and the work piece 15, resulting in a relatively poor quality weld.

The quality of the weld produced by the sampled pulsed waveform may be determined in step 100 based at least in part on the nature of differences between the reference waveform and one or more sampled pulsed waveforms corresponding to the performed weld. Consistency (e.g., small differences) between the sampled pulsed waveforms and the reference pulsed waveform may be used to determine that the weld corresponding to the sampled pulsed waveforms is of similar quality to the weld corresponding to the reference pulsed waveform. Inconsistency (e.g., large differences) between the sampled and reference pulsed waveforms may be used to determine that the weld corresponding to the sampled pulsed waveform is of relatively poor quality compared to the weld corresponding to the reference pulsed waveform. In some embodiments, differences at particular points (e.g., transition between background phase and transfer phase) may be used to determine the relative quality of the weld corresponding to the sampled pulsed waveforms. The determined weld quality may be a value that quantifies the difference between the sampled and reference pulsed waveforms (e.g., average absolute value difference, summed difference from each point, and so forth), a value that measures consistency and/or similarity of the sampled and reference pulsed waveforms (e.g., average percentage difference for each point, degree of fit, and so forth), a value that indicates a particular weld quality, or combinations thereof.

The quality of the weld corresponding to the sampled pulsed waveforms may then be displayed (e.g., step 102). The quality of the weld may be displayed on the operator interface 42 via the display 46 or the indicators 48, on the remote device 52, on the network 64, or combinations thereof. In some embodiments, the quality determined in step 100 may be displayed as one of the values discussed above. For example, the sampled and reference waveforms may be displayed along with the value corresponding to the degree of fit between the displayed pulsed waveforms. In an embodiment, the chart of FIG. 3 may be displayed, illustrating the ideal pulsed waveform 122 and absolute value comparisons 138, 140, 142, 144.

In some embodiments, the manner in which the quality is displayed may be based on whether the quality is outside set pulsed waveform difference thresholds (e.g., step 104). For example, a determined quality within the set pulsed waveform difference thresholds may activate an indicator 48 for good quality (e.g., light, icon) on the user interface 42 (e.g., step 106), whereas a determined quality outside the set pulsed waveform difference thresholds may activate an indicator 48 for relatively poor quality (e.g., step 108). In an embodiment, an indicator 48 may only alert the operator of relatively poor quality. Other indicators 48 may be used to alert the operator to various other quality levels of the performed weld relative to a reference weld. In some embodiments, input devices 38 may provide for adjustment of the set pulsed waveform difference thresholds. Pulsed waveform difference thresholds may be stored in the memory 54 and adjusted by the operator. Adjusting the set pulsed waveform difference thresholds may enable the welding system 10 to provide a desired level of feedback on the quality of the weld. For example, wide pulsed waveform difference thresholds may be set for a novice operator so that the welding system 10 may alert the novice operator of acceptably or unacceptably performed welds during training of the novice operator. Narrow and/or nested pulsed waveform difference thresholds may be set for a skilled operator so that the welding system 10 may alert the skilled operator as to which welding standard the performed weld satisfies.

After displaying the quality, the welding system 10 and/or operator may compensate to better match the sampled pulse waveform with the reference pulsed waveform (e.g., step 110). The control circuitry 26 may adjust the operation of the power supply 16, adjust the wire feeder 28, adjust the gas supply 32, or combinations thereof. The operator may also adjust the relative position of the welding torch 14 to the work piece 15 for a subsequent weld to compensate.

Individual steps of the method 90 may be repeated to analyze the subsequent sampled pulsed waveforms corresponding to subsequent welds. In some embodiments, the obtaining and storing steps 92, 94 may be omitted when using previously obtained reference pulsed waveforms. Optionally, a plurality of sampled pulsed waveforms corresponding to the performed weld may be stored in the memory 54 as reference pulsed waveforms (e.g., step 94) and compared to each other (e.g., step 98). The quality determined in step 100 may be based at least in part on differences between sampled pulsed waveforms. For example, small differences between sampled pulsed waveforms corresponding to the same performed weld may be used to determine a consistent quality throughout the weld. Large differences between sampled pulsed waveforms of the same performed weld may be used to determine a change in weld quality or other weld parameter. Furthermore, quality trends may be identified through comparison (e.g., step 98) amongst the plurality of sampled pulsed waveforms that indicate relative changes (e.g., improvement, decline) in quality throughout a weld.

Additionally, in some embodiments of the method 90, the welding system 10 may optionally determine a weld parameter based at least in part on the comparison of step 98 (e.g., step 112). Some differences from the comparison may correlate with certain weld parameters such that the welding system 10 may determine the certain weld parameters based on the type of difference. For example, large differences between sampled pulsed waveforms corresponding to the same performed weld may be used to determine inconsistent relative positioning of the welding torch 14 with the work piece 15 during the course of the performed weld. The average absolute value difference for the compared points between sampled pulsed waveforms and the reference pulsed waveform may also be used to determine electrode extension. Thus, the welding system 10 may diagnose and identify factors affecting the quality of performed welds through comparison of sampled pulsed waveforms with reference pulsed waveforms and/or sampled pulsed waveforms.

FIG. 3 illustrates a chart 120 of an ideal pulsed power waveform 122 and comparisons with sampled pulsed power waveforms. The Y-axis 124 of the chart 120 shows the power in watts, and the X-axis 126 shows the time in seconds. The illustrated ideal pulsed power waveform 122 has a first set of weld parameters including an electrode extension of 0.4 inches. The ideal pulsed power waveform 122 includes a peak phase 128 and a background phase 130. The illustrated peak phase 128 has a first phase 132 in which the power supply 16 increases the current at a certain rate (e.g., 1000 A/ms), bringing up the voltage and power. During a second phase 134 of the peak phase 128, the current reaches a desired peak and the voltage is held constant for the remainder of the peak phase 128. During the second phase 134, the power of the ideal pulsed power waveform 122 may continue to increase as the current increases. The welding torch 14 may transfer the melted electrode 20 to the work piece 15 during the peak phase 128. During the third phase 136 (e.g., of the background phase 130), the current and voltage decrease to background levels for the duration of the background phase 130. After the background phase 130, another pulse period may begin. In some embodiments, each pulse period is approximately 0.007 seconds. This ideal pulsed power waveform 122 may correspond to an ideal performed weld as discussed above. Subsequent sampled pulsed power waveforms corresponding to subsequent performed welds may be compared to this ideal pulsed power waveform 122 to determine the quality of the performed welds relative to the ideal performed weld.

The chart 120 includes the point-to-point comparison of four sampled pulsed power waveforms. Each of the point-to-point comparisons 138, 140, 142, 144 shows the absolute difference between one of the sampled pulsed power waveforms and the ideal pulsed power waveform at sampled points. In this embodiment, each of the four sampled pulsed power waveforms has the same first set of weld parameters as the ideal pulsed power waveform, except for electrode extension. The first comparison 138 relates to a first sampled pulsed power waveform from a weld performed with a 0.4 inch electrode extension. The second comparison 140 relates to a second sampled pulsed power waveform from a weld performed with a 0.6 inch electrode extension. The third comparison 142 relates to a third sampled pulsed power waveform from a weld performed with a 0.8 inch electrode extension. The fourth comparison 144 relates to a fourth sampled pulsed power waveform from a weld performed with a 1.0 inch electrode extension. The differences at each point of the first comparison 138 are smaller than the differences at each point for the second, third, and fourth comparisons 140, 142, and 144. This is because the ideal pulsed power waveform and the first sampled pulsed power waveform have the same first set of weld parameters, including electrode extension. The second, third, and fourth comparisons 140, 142, and 144 show larger differences due to at least the longer electrode extension.

In the illustrated embodiment, the second, third, and fourth comparisons 140, 142, 144 exhibit greater differences relative to the ideal pulsed power waveform during the second phase 134 of the peak phase 128. During the first phase 132 of the peak phase 128, the power supply 16 may increase the voltage and current similarly regardless of electrode extension, resulting in very similar ideal and sampled pulsed power waveforms with small differences in the comparisons 138, 140, 142, 144. Electrode extension may affect the constant voltage level of the second phase 134, which in turn affects the pulsed power waveforms. Comparisons between pulsed power waveforms relating to different electrode extensions may exhibit absolute value differences during the second phase 134 in particular. As illustrated, during the second phase 134, the fourth comparison 144 (electrode extension=1.0 inches) exhibits the greatest absolute value difference relative the ideal pulsed power waveform (electrode extension=0.4 inches). The third comparison 142 (electrode extension=0.8 inches) has a smaller absolute value difference during the second phase 134 than the fourth comparison 144 (electrode extension=1.0 inches), but larger absolute value difference than the first comparison 138 (electrode extension=0.4 inches) and second comparison 140 (electrode extension=0.6 inches). The second comparison 140 (electrode extension=0.6 inches) has larger absolute value difference during the second phase 134 than only the first comparison (electrode extension=0.4 inches).

FIG. 4 is a chart 146 illustrating the average absolute value power difference 148 of four sampled pulsed power waveforms having different electrode extensions as compared to four ideal pulsed power waveforms having different electrode extensions. The X-axis 150 represents the electrode extension of the ideal pulsed power waveform used for comparison with the sampled pulsed power waveforms. The four sampled pulsed power waveforms have common weld parameters, except each has a different electrode extension. The set of four ideal pulsed power waveforms used for comparison have the same common weld parameters, except each has a different known electrode extension. The point-to-point comparisons between the ideal and sampled pulsed power waveforms may result in absolute value differences for each point of comparison. The average absolute value differences 152, 154, 156, 158, are the average of the point-to-point comparisons for the sampled pulsed power waveforms at each ideal pulsed power waveform of known electrode extension. For example, the sampled pulsed power waveform of the 0.6 inch electrode extension has the lowest average absolute value difference 154 relative to the 0.6 inch electrode extension ideal pulsed power waveform. The first set of points 152 are the average absolute value differences for the first sampled pulsed power waveform (electrode extension=0.4 inches). The second set of points 154 are the average absolute value differences for the second sampled pulsed power waveform (electrode extension=0.6 inches). The third set of points 156 are the average absolute value differences for the third sampled pulsed power waveform (electrode extension=0.8 inches). The fourth set of points 158 are the average absolute value differences for the fourth sampled pulsed power waveform (electrode extension=1.0 inches). Curves 160, 162, 164, and 166 join points of the same set and represent estimated absolute value differences for each electrode extension as compared to ideal pulsed power waveforms having different electrode extensions.

FIG. 4 illustrates the relationship between electrode extension and average absolute power difference 148 that may be used to determine electrode extension. As described above, in this embodiment, the only varied weld parameter is electrode extension. As illustrated, the minimum average absolute value power difference of the second point 154 (electrode extension=0.6 inches) corresponds to the comparison with the ideal pulsed power waveform having an electrode extension of 0.6 inches. Similarly, the minimum average absolute value difference of the third point 156 (electrode extension=0.8 inches) corresponds to the comparison with the ideal pulsed power waveform having an electrode extension of 0.8 inches. Thus, at least when weld parameters are the same except for electrode extension, the minimum average absolute value difference of a sampled pulsed power waveform corresponds to the ideal pulsed power waveform having the same electrode extension. This may be used to determine the approximate electrode extension of a sampled pulsed power waveform in real-time based on comparison with ideal pulsed power waveforms of different electrode extensions. However, determining electrode extension is one non-limiting example of how comparison of sampled pulsed waveforms with ideal pulsed waveforms may be used to determine weld parameters. In this way, the welding system 10 may be configured to determine and display weld parameters and/or weld quality to provide real-time weld feedback.

The welding system and method described above herein may be used to determine the consistency of the GMAW-P welding arc and weld parameters. The welding system 10 may obtain and store reference pulsed waveforms for comparison with sampled pulsed waveforms. Reference pulsed waveforms may be obtained from any source, including performed welds, other welding systems, remote devices, networks, the Internet, or combinations thereof. The sampled pulsed waveforms from performed welds and reference pulsed waveforms may be compared to determine general differences (e.g., duration, degree of fit, and so forth) or differences at one or more points during a pulse (e.g., point-to-point, maximum, minimum, and so forth). These differences may be used to determine the quality of the performed weld relative to the weld corresponding to the reference weld. The differences may also be used to determine weld parameters. In some embodiments, sampled pulsed waveforms may be compared to multiple reference pulsed waveforms to determine the quality and/or weld parameters. The differences, quality, and weld parameters may be displayed on the operator interface, remote device, or network. The welding system may be configured to alert the operator of the weld quality and/or weld parameter based at least in part on set pulsed waveform difference thresholds. The operator may adjust these pulsed waveform difference thresholds through the activation of input devices of operator interface.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
a base unit configured to supply the welding torch with a pulsed electrical current for producing a welding arc between a welding torch and a work piece; and
control circuitry configured to:
detect signals relating to the pulsed electrical current and to store in memory a pulsed waveform based on the signals as an idealized pulsed waveform;
detect subsequent signals relating to a subsequent pulsed electrical current supplied to the welding torch; and
compare a subsequent pulsed waveform based on the subsequent signals with the idealized pulsed waveform.

2. The welding system of claim 1, wherein the control circuitry is configured to quantify a difference between the subsequent pulsed waveform and the idealized pulsed waveform.

3. The welding system of claim 2, wherein the control circuitry is configured to display the difference between the subsequent pulsed waveform and the idealized pulsed waveform on an operator interface.

4. The welding system of claim 1, comprising an operator interface having an input device, wherein activation of the input device adjusts a pulsed waveform difference threshold.

5. The welding system of claim 1, comprising an operator interface having an input device, wherein the control circuitry stores the idealized pulsed waveform in the memory based on activation of the input device.

6. The welding system of claim 1, wherein the pulsed waveform is a power waveform.

7. The welding system of claim 1, wherein the pulsed waveform is a voltage waveform or a current waveform.

8. The welding system of claim 1, wherein the control circuitry is configured to adjust a current, a voltage, a wire feed speed, or a gas supply to match the subsequent pulsed waveform with the idealized pulsed waveform.

9. A method, comprising:
detecting signals relating to a pulsed electrical current supplied to a welding torch for producing a welding arc between the welding torch and a work piece;
storing in memory a pulsed waveform based on the signals as an idealized pulsed waveform;
detecting subsequent signals relating to a subsequent pulsed electrical current supplied to the welding torch; and
comparing a subsequent pulsed waveform based on the subsequent signals with the idealized pulsed waveform.

10. The method of claim 9, comprising quantifying a difference between the subsequent pulsed waveform and the idealized pulsed waveform.

11. The method of claim 10, comprising displaying the difference between the subsequent pulsed waveform and the idealized pulsed waveform on an operator interface.

12. The method of claim 11, comprising presenting an alert via the operator interface if the difference between the subsequent pulsed waveform and the idealized pulsed waveform exceeds a pulsed waveform difference threshold.

13. The method of claim 9, comprising receiving a command to store the idealized pulsed waveform via an operator interface.

14. The method of claim 9, comprising receiving a command to store the idealized pulsed waveform via control circuitry.

15. The method of claim 9, comprising storing in memory a pulsed power waveform based on the signals as an idealized pulsed power waveform.

16. The method of claim 9, comprising:
storing in memory a pulsed voltage waveform based on the signals as an idealized pulsed voltage waveform; and
storing in memory a pulsed current waveform based on the signals as an idealized pulsed current waveform.

17. The method of claim 9, comprising adjusting a current, a voltage, a wire feed speed, or a gas supply to match the subsequent pulsed waveform with the idealized pulsed waveform.

18. A welding system, comprising:
a welding torch comprising an electrode;
a base unit configured to supply the welding torch with pulsed electrical signals for producing welding arcs between the welding torch and a work piece; and
control circuitry configured to:
detect a first set of signals relating to a first pulsed electrical current supplied to the welding torch by the base unit;
store in memory a first pulsed power waveform based on the first set of signals;
detect a second set of signals relating to a second pulsed electrical current supplied to the welding torch by the base unit; and
compare a second pulsed power waveform based on the second set of signals with the first pulsed power waveform.

19. The welding system of claim 18, wherein the control circuitry is configured to quantify a difference between the first pulsed power waveform and the second pulsed power waveform.

20. The welding system of claim 19, wherein the control circuitry is configured to determine an extension of the electrode relating to the second pulsed power waveform based at least in part on the difference.

\* \* \* \* \*